United States Patent
Choksi (10) Patent No.: US 8,254,876 B1
(45) Date of Patent: Aug. 28, 2012

(54) SYSTEMS AND METHODS FOR SUPPORTING DISPATCH COMMUNICATIONS

(75) Inventor: Ojas T. Choksi, Herndon, VA (US)

(73) Assignee: Nextel Communications, Inc., Reston, VA (US)

( * ) Notice: Subject to any disclaimer, the term of this patent is extended or adjusted under 35 U.S.C. 154(b) by 1703 days.

(21) Appl. No.: 11/324,239

(22) Filed: Jan. 4, 2006

(51) Int. Cl.
  *H04W 4/04* (2009.01)
(52) U.S. Cl. .................. 455/404.2; 455/435.1; 370/335
(58) Field of Classification Search .............. 455/404.2, 455/435.1, 432.1, 456.1, 518, 90.2; 370/327, 370/331, 335, 337, 340, 342, 441
See application file for complete search history.

(56) References Cited

U.S. PATENT DOCUMENTS

| | | | |
|---|---|---|---|
| 6,640,109 B1* | 10/2003 | Drozt et al. ................. | 455/508 |
| 2003/0154249 A1* | 8/2003 | Crockett et al. ............. | 709/204 |
| 2004/0002351 A1 | 1/2004 | Upp et al. | |
| 2006/0003784 A1* | 1/2006 | Chion et al. ................. | 455/518 |
| 2006/0063549 A1* | 3/2006 | Choksi ......................... | 455/518 |
| 2006/0148503 A1* | 7/2006 | Lasisi et al. ................. | 455/518 |
| 2006/0264213 A1* | 11/2006 | Thompson .................... | 455/433 |
| 2007/0049314 A1* | 3/2007 | Balachandran et al. ...... | 455/518 |
| 2007/0060133 A1* | 3/2007 | Spitzer et al. ................ | 455/445 |
| 2007/0064630 A1* | 3/2007 | Olivier et al. ................ | 370/278 |
| 2007/0140255 A1* | 6/2007 | Gautier et al. ............ | 370/395.5 |
| 2008/0084839 A1* | 4/2008 | Xie et al. ...................... | 370/327 |
| 2008/0108319 A1* | 5/2008 | Gallagher ................. | 455/404.2 |
| 2010/0198933 A1* | 8/2010 | Smith et al. .................. | 709/206 |
| 2010/0211660 A1* | 8/2010 | Kiss et al. .................... | 709/221 |
| 2011/0188456 A1* | 8/2011 | Rawat et al. ................. | 370/328 |

FOREIGN PATENT DOCUMENTS

WO    WO2006002576    *  1/2006

\* cited by examiner

*Primary Examiner* — Kamran Afshar
*Assistant Examiner* — Khawar Iqbal (57) ABSTRACT

Systems and methods for a wireless communication network to support dispatch communications with a dispatch communication client located outside of the wireless communication network are provided. The dispatch communication network includes one or more application services gateways (ASGs) for supporting dispatch communication clients located outside of the wireless communication network. Systems and methods for registering, and tracking the location of, dispatch communication clients, located outside of a wireless communication network, with the wireless communication network are provided. Additionally, systems and methods for selecting a dispatch communication gateway, and for allowing a dispatch communication client, located in a private network, to perform voice dispatch communication with a wireless communication network are also provided.

15 Claims, 6 Drawing Sheets

SYSTEMS AND METHODS FOR SUPPORTING DISPATCH COMMUNICATIONS

BACKGROUND OF THE INVENTION

Wireless communications systems typically provide interconnect and/or dispatch voice communication services. Interconnect voice communication services are those typically provided by most wireless carriers as circuit-switched communications. Dispatch communication services are commonly known as walkie-talkie or push-to-talk (PTT) types of calls, such as Sprint Nextel Corporation's service identified by the trade name Direct Connect. Interconnect voice communication services provided by most wireless carriers can be provided between sources and destinations of different wireless carriers.

In contrast to interconnect voice communication services, dispatch communication services are typically implemented in a proprietary manner, which prevents dispatch calls from originating in one wireless carrier's network and terminating in another wireless carrier's network. Additionally, voice dispatch communication services are typically implemented only in wireless communication networks. Accordingly, it would be desirable to provide systems and methods for a wireless communication network, which supports voice dispatch communications, to support voice dispatch communications with dispatch clients located outside of the wireless communication network.

SUMMARY OF THE INVENTION

In accordance with exemplary embodiments of the present invention, an application services gateway (ASG), i.e., a dispatch communication gateway, provides the ability of voice dispatch communication clients located outside of a particular wireless communication network to perform voice dispatch communications with other clients located outside of the wireless communication network, and with clients located within the wireless communication network. A dispatch communication client can include software running on a computer (such as a desktop or portable computer), software and/or hardware running on a mobile or fixed communication device, or the like. A dispatch communication client is located outside of the particular wireless communication network when the client communicates with the wireless communication network via a communication medium other than the air-interface used by the wireless communication network, (e.g., the Internet for a desktop client, a T1 connection for a mobile client located in a different wireless communication network which communicates using a different air-interface protocol, or the like).

The present invention provides systems and methods for registering, and tracking the location of, dispatch communication clients, located outside of a wireless communication network, with the wireless communication network. The present invention also provides systems and methods for selecting a dispatch communication gateway, and for allowing a dispatch communication client, located in a private network, to perform voice dispatch communications with a wireless communication network.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
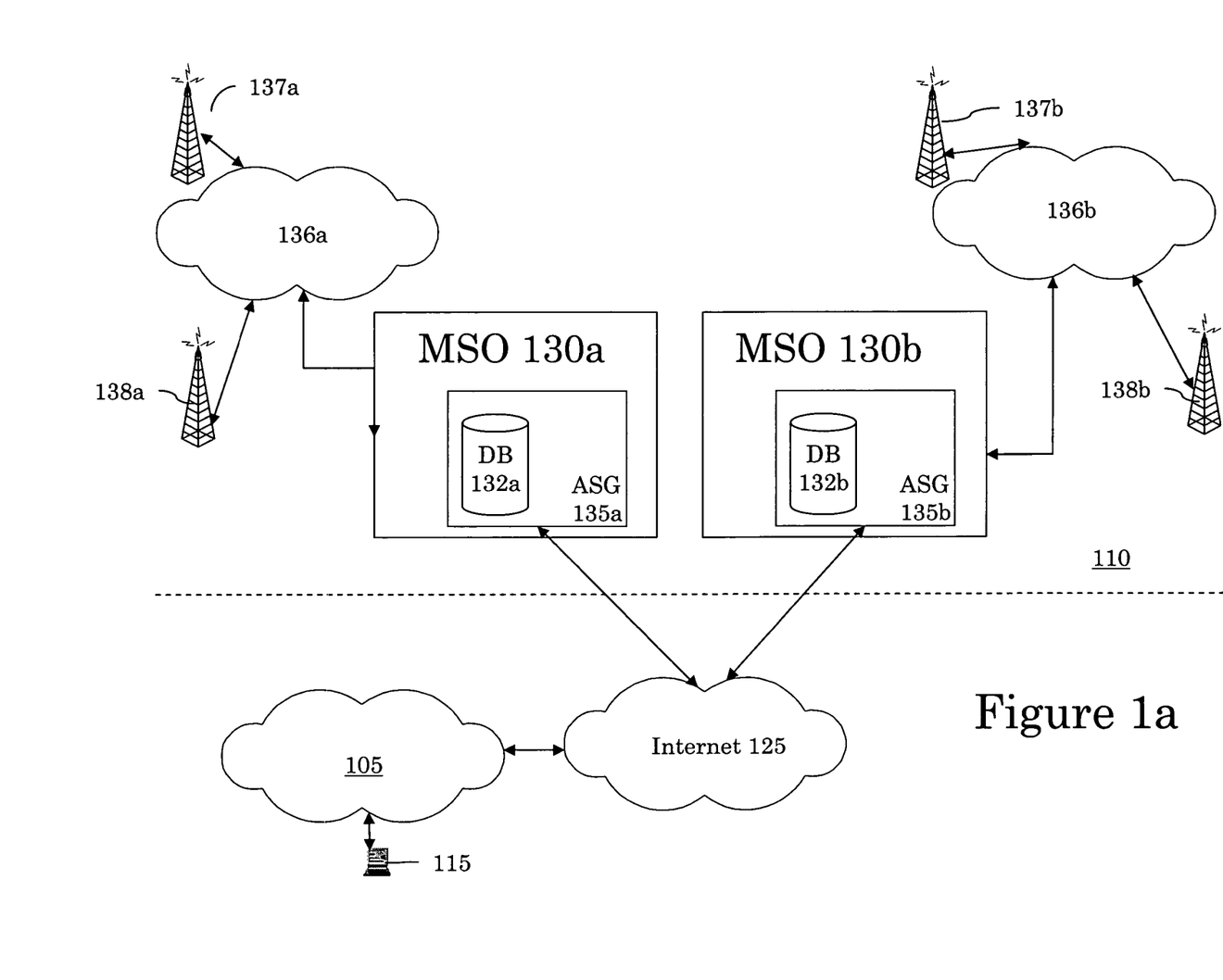
FIG. 1a is a block diagram illustrating an exemplary communication system for supporting voice dispatch communication services with dispatch communication clients located outside of a particular wireless communication network.

FIG. 1a illustrates an exemplary communication system for supporting voice dispatch communication services with dispatch communication clients located outside of a particular wireless communication network. The communication system includes a wireless communication network 110 and another communication network 105. The wireless communication network supports voice dispatch communication services, while the another communication network 105 need not necessarily support voice dispatch communication services. Instead, the voice dispatch communication services are provided as an application within communication network 105, and the signaling and media for supporting the dispatch communication are carried using transport layer protocols native to network 105. For example, dispatch communication signaling can be provided using session initiation protocol (SIP) and media can be transported using real-time protocol (RTP), both of which can be carried in Internet Protocol (IP) packets.

The communication system includes a dispatch client 115, mobile switching offices (MSOs) 130a and 130b, and base stations 137a, 137b, 138a and 138b. MSOs 130a and 130b are coupled to base stations 137a, 137b, 138a and 138b via networks 136a and 136b. Networks 136a and 136b represent the various conventional components which couple MSOs to base stations, including, but not limited to, base site controllers, digital cross-connect switches, packet gateways, dispatch servers and the like. MSOs 130a and 130b operate in a conventional manner to support wireless communications at base stations 137a, 137b, 138a, and 138b.

MSOs 130a and 130b respectively include ASGs 135a and 135b, which provide voice dispatch communication services to the dispatch client 115. Specifically, the dispatch client 115 is coupled to ASGs 135a and 135b via another network 105 and a publicly-accessible data network, such as Internet 125. Although FIG. 1 illustrates only a single dispatch client, the system can include a number of dispatch clients. Additionally, the dispatch client 115 can be a wireless communication station, such as a mobile station, which operates in a different wireless communication network, which is coupled to the ASG via, for example, a T-1 connection. Moreover, the wireless communication network 110 can include more than two MSOs.

One technique for providing voice dispatch services to dispatch client 115 is to provision information related to a dispatch subscriber, operating the dispatch client 115, in each ASG. Specifically, dispatch subscriber information is stored in database 132a of ASG 135a and the same information is stored in database 132b of ASG 135b. This type of provisioning may require the least amount of changes to the wireless communication network to support dispatch communication clients located outside of the wireless communication network. Each dispatch client and dispatch subscriber (in network 105) is provisioned in each ASG in network 110 because dispatch clients and dispatch subscribers may, at different times, be supported through different ASGs.

There are a number of drawbacks to provisioning every subscriber in each ASG. Specifically, this type of provisioning is not scalable, and can lead to operational inefficiencies such as increased cost of provisioning dispatch clients and subscribers, and troubleshooting such provisioning. In addition, because there is no communication between the ASGs, there is the possibility of fraudulent usage of a single subscriber's registration information via multiple log-ins from multiple dispatch clients on multiple ASGs.

Figure 1B:
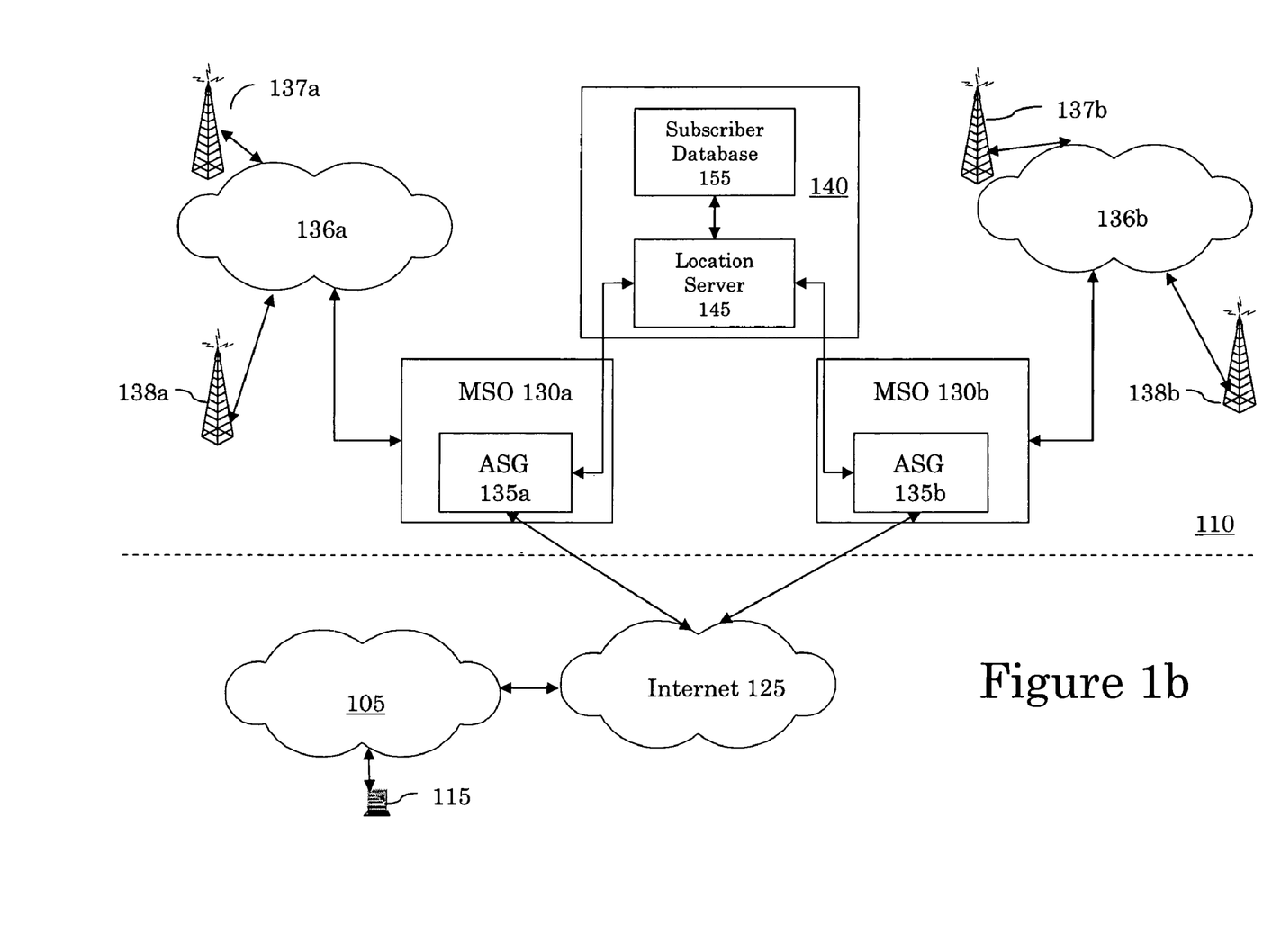
FIG. 1b is a block diagram illustrating an exemplary communication system for supporting voice dispatch communication services with dispatch communication clients located outside of a particular wireless communication network in accordance with the present invention.

FIG. 1b illustrates an exemplary communication system which overcomes the deficiencies discussed above with regard to the communication system of FIG. 1a. In the system of FIG. 1b, instead of provisioning each dispatch client in each ASG, the dispatch clients and dispatch subscribers are provisioned in subscriber database 155 of the wireless core network 140. The subscriber database 155 is an element which is typically used in wireless communication networks to support wireless communication devices. In accordance with the present invention, a location server 145 is provided for tracking the ASG the dispatch client 115 and the associated dispatch subscriber are registered with. The location server 145 determines, based on provisioned information, which ASG a dispatch subscriber should registered with, so that a call can be routed to the dispatch subscriber's current location. The subscriber database 155 contains authentication and authorization information for the dispatch subscriber associated with dispatch client 105.

The use of a centralized location server 145 and subscriber database 155 allows a subscriber to set restrictions on specific dispatch communication clients which are authorized for the subscriber's registration information. Moreover, provisioning data for subscribers, located outside of the wireless communication network 110, in the subscriber database 155 of the wireless network 110 and tracking the subscriber's location in location server 145 should prevent fraudulent use of the subscriber's credentials from multiple dispatch communication clients.

Figure 2:
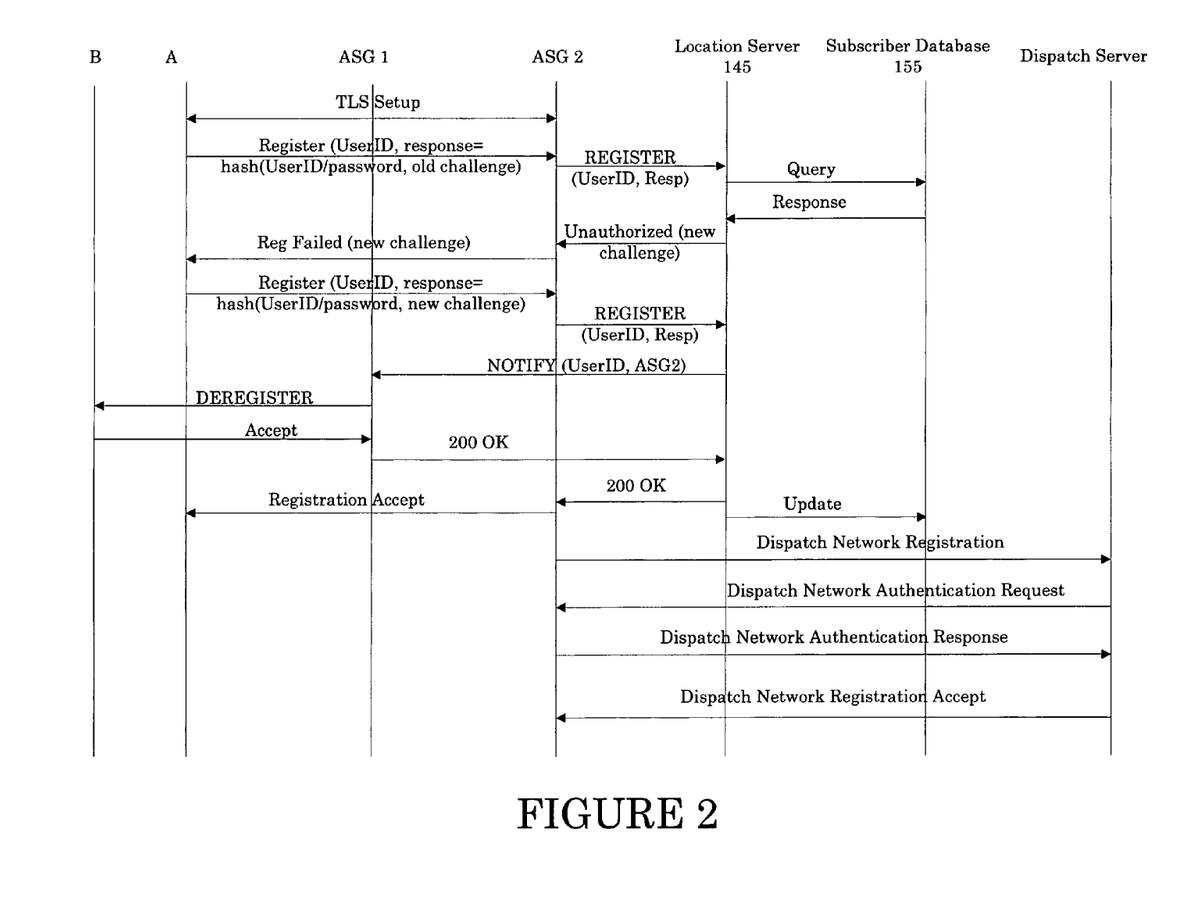
FIG. 2 is a signaling diagram illustrating exemplary signaling for resolving dispatch subscriber registration from disparate clients and gateways in accordance with the present invention.

FIG. 2 illustrates exemplary signaling for dispatch subscriber registration in accordance with the present invention. Specifically, FIG. 2 illustrates signaling for a subscriber registering from client A who has previously registered from client B. In response to a registration request from a dispatch subscriber, client A establishes a transport layer security (TLS) connection with ASG 2 using known TLS setup procedures. The TLS setup procedures identifies client A to ASG 2. Client A then sends a "Register" message, which includes a user identification (UserID), and a response. The Register message is part of an authentication and authorization procedure. The response is the subscriber UserID and password being hashed by the last challenge received by the client A (i.e., old challenge) to ASG 2. Additionally, the Register message can include an identification of the client, which may be useful if a system allows simultaneous registration from a limited number of dispatch clients.

ASG 2 sends a REGISTER message with the UserID and hashed response to the location server 145, which sends a registration "Query" message to the subscriber database 155. The Query message requests that the subscriber database 155 provide the subscriber's dispatch communication network authentication and authorization information. The subscriber database 155 confirms the registration by sending a "Response" message, indicating that a new challenge is necessary. Accordingly, location server 145 sends an Unauthorized message with a new challenge to ASG 2. ASG 2 sends a Reg Failed message, along with the new challenge, to client A.

In response to the failed registration message, client A sends a new Register message, with the UserID and password being hashed with the new challenge. ASG 2 sends a Register message, including the UserID and the hashed response, to location server 145. Location server 145 responds by notifying ASG 1 that client A is registering on ASG 2. ASG 1 then terminates client B's registration for the subscriber by sending a DEREGISTER message, which is confirmed by client B sending an Accept message.

Once client B accepts the deregistration of the subscriber, ASG 1 confirms the deregistration by sending a 200 OK message to location server 145. Location server 145 confirms the registration of the subscriber to ASG 2 by sending a 200 OK message, which includes the subscriber's information for registration with the dispatch communication network. The 200 OK message can include the subscriber's authentication and authorization information, or ASG 2 can obtain this information in an additional query to subscriber database 155 (not illustrated). Location server 145 updates the subscriber's location by sending an Update message to subscriber database 155. ASG 2 confirms client A's registration by sending a Registration Accept message.

ASG 2 then proceeds to register the subscriber with the dispatch communication network in its normal fashion, using either the information in the 200 OK message or information obtained from subscriber database 155. Specifically, ASG 2 sends a Dispatch Network Registration message to the dispatch server, which responds with a Dispatch Network Authentication Request message. ASG 2 sends a Dispatch Network Authentication Response message, including the subscriber's information necessary for registration, and the dispatch server confirms the registration by sending a Dispatch Network Registration Accept message. Accordingly, the subscriber is now able to initiate and receive dispatch communications at dispatch client A.

As discussed above, support for dispatch services to clients located outside of the wireless communication network is provided using the ASGs. Because one method for the dispatch clients to connect to the ASGs is through the Internet, the dispatch clients can be assigned to any of the ASGs. However, due to limitations of certain wireless networks, it may be necessary for the dispatch subscriber to be assigned to a particular ASG. For example, in current iDEN networks, such as those owned and operated by Sprint Nextel Corporation, predefined dispatch talk group calls can only be made between dispatch subscribers assigned to the same MSO. Although this limitation may be removed in the near future, to maintain compatibility with existing iDEN networks, the decision of which ASG to assign a dispatch client can be based upon which dispatch talk groups the dispatch client is associated with.

Figure 3:
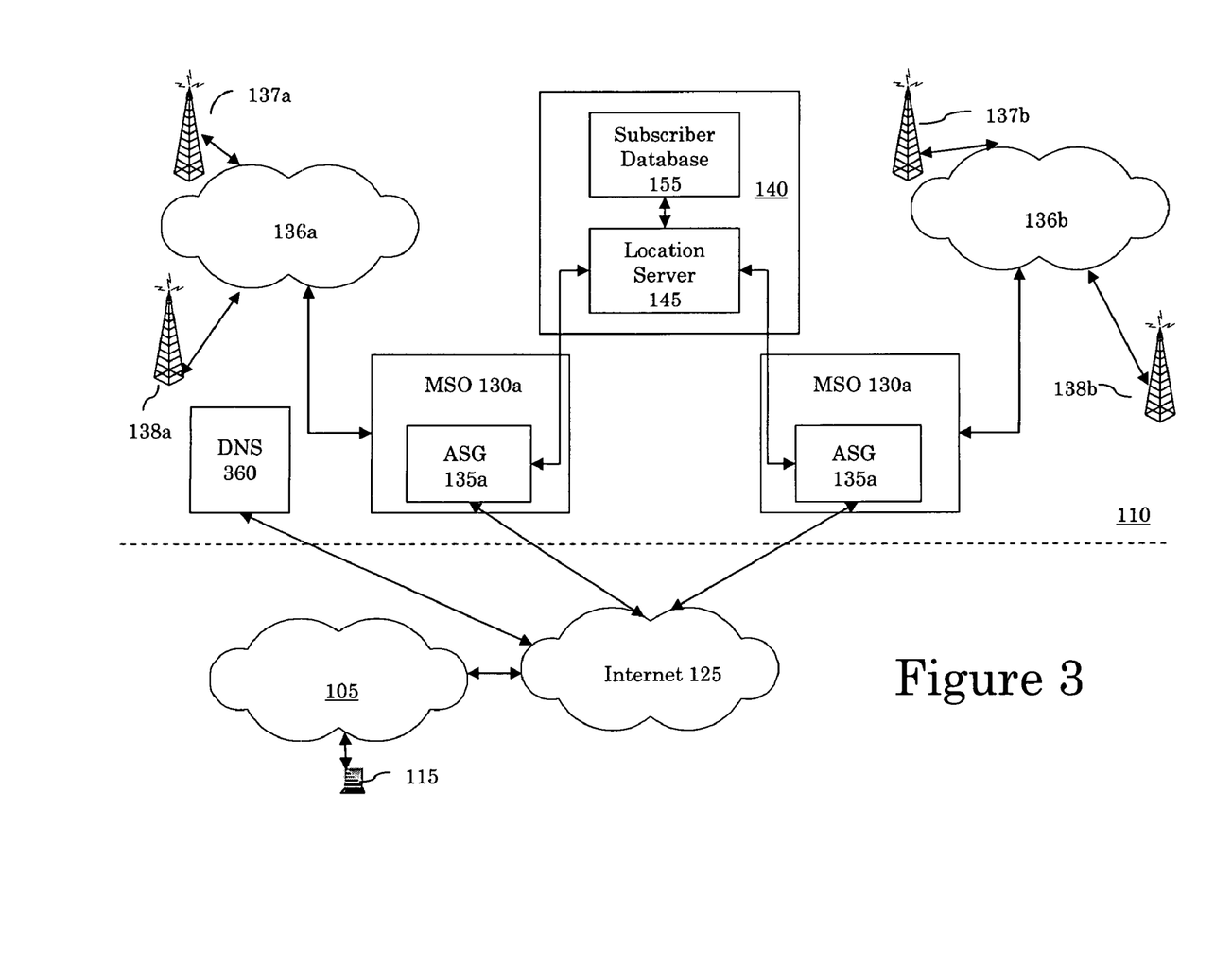
FIG. 3 is a block diagram illustrating an exemplary system for dynamic discovery of application services gateways (ASGs) in accordance with the present invention.

FIG. 3 illustrates an exemplary system for dynamic discovery of ASGs in accordance with the present invention. Elements in FIG. 3 which have the same reference numerals as those discussed above with regard to FIGS. 1a and 1b have the same functions, and a description of these elements will not be repeated. In accordance with exemplary embodiments of the present invention, a conventional domain name server (DNS) 360 is provided with additional functionality to support dynamic discovery of ASGs. Upon receiving requests for ASG assignments from dispatch clients, the DNS can make dynamic decisions of the assignments based on, for example, load balancing and/or predefined dispatch talk group call limitations.

Figure 4:
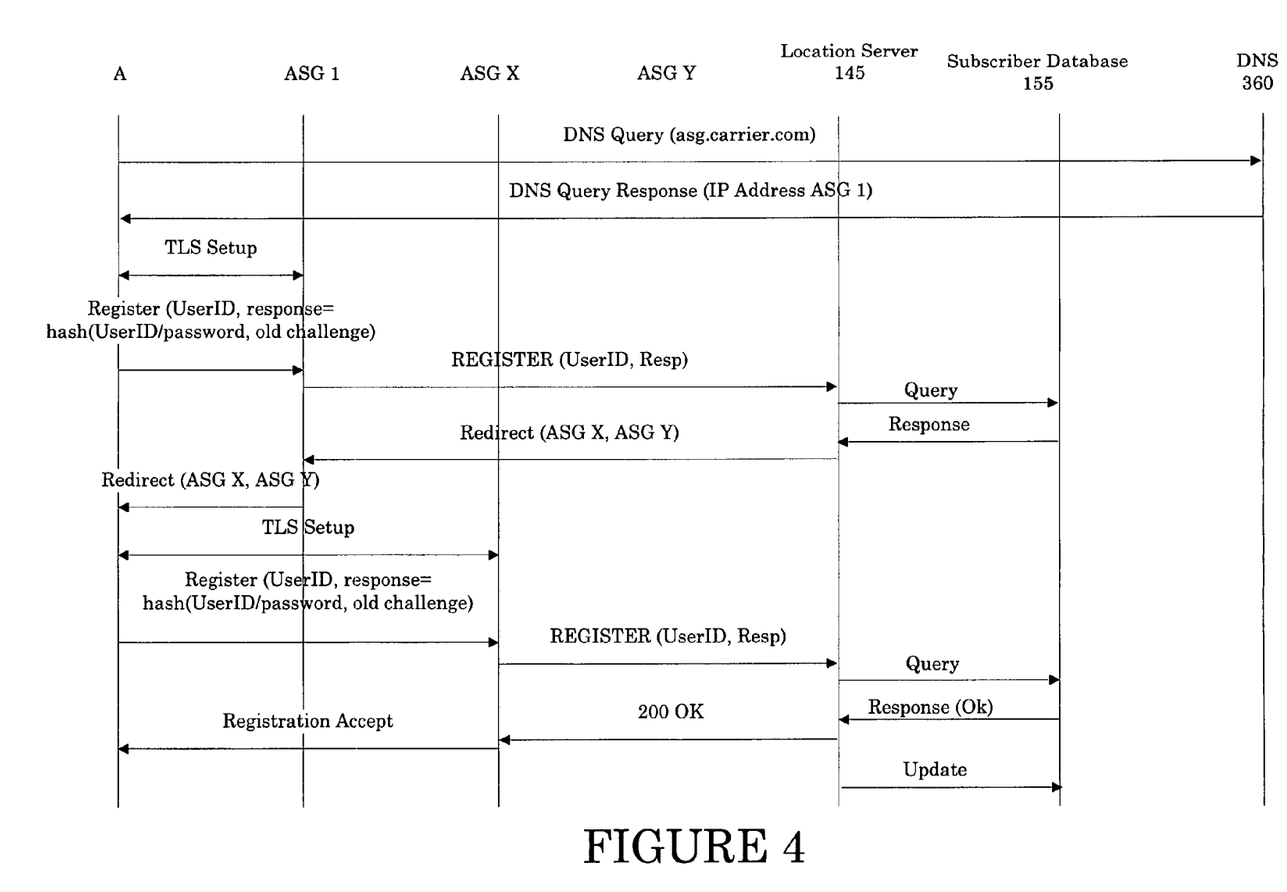
FIG. 4 is a signaling diagram illustrating exemplary signaling for dynamic discovery of ASGs in accordance with the present invention.

FIG. 4 illustrates exemplary signaling for dynamic discovery of ASGs in accordance with the present invention. Client A sends a DNS Query message, including a domain name of the carrier, to DNS 360. DNS 360 responds with a DNS Query Response message with the IP address of ASG 1.

Client A then begins the registration process with ASG 1 by setting up a TLS connection and sending a Register message. ASG 1 sends a Register message to location server 145, including the UserID and a response, which includes the UserID and password hashed with the old challenge. Location server 145 sends a Query message to subscriber database 155, which responds with a Response message including the subscriber's authentication and authorization information for registration with the dispatch communication network and an identification of the specific ASG with which the subscriber should register.

The location server 145 determines that ASG 1 is not the best ASG for supporting client A and sends a Redirect message to ASG 1 identifying alternative ASGs, e.g., the subscriber registered with the client is a member of a dispatch talk group which is not supported by ASG 1. ASG 1 forwards the redirect message to client A, which then selects one of the identified ASGs. Client A attempts to register with the selected ASG by establishing a TLS connection with, and sends a Register message to, ASG X. ASG X then sends a Register message to location server 145, which again sends a Query to subscriber database 155. Subscriber database confirms the registration by sending a Response message to location server 145, which confirms registration to ASG X by sending a 200 OK message. ASG X confirms the registration to client A by sending a Registration Accept message. Location server 145 then sends an Update message to subscriber database 155 informing it of the subscriber's new location. Although not illustrated in FIG. 4, ASG X then performs the challenge and response messaging and dispatch network registration described above in connection with FIG. 2.

Because conventional voice dispatch communication services within wireless networks are very popular with businesses, it is anticipated that many businesses may desire support for dispatch communication services using clients located outside of a wireless communication network, such as desktop computers running dispatch communication client software. Businesses typically use firewalls between their private networks and the Internet. The desktop computers, which are running the dispatch communication client software, are located on a private network, and are assigned private IP addresses, which are not visible to users located outside of the firewall. Accordingly, dispatch communication services for desktop computers should provide mechanisms for communicating through firewalls.

Figure 5:
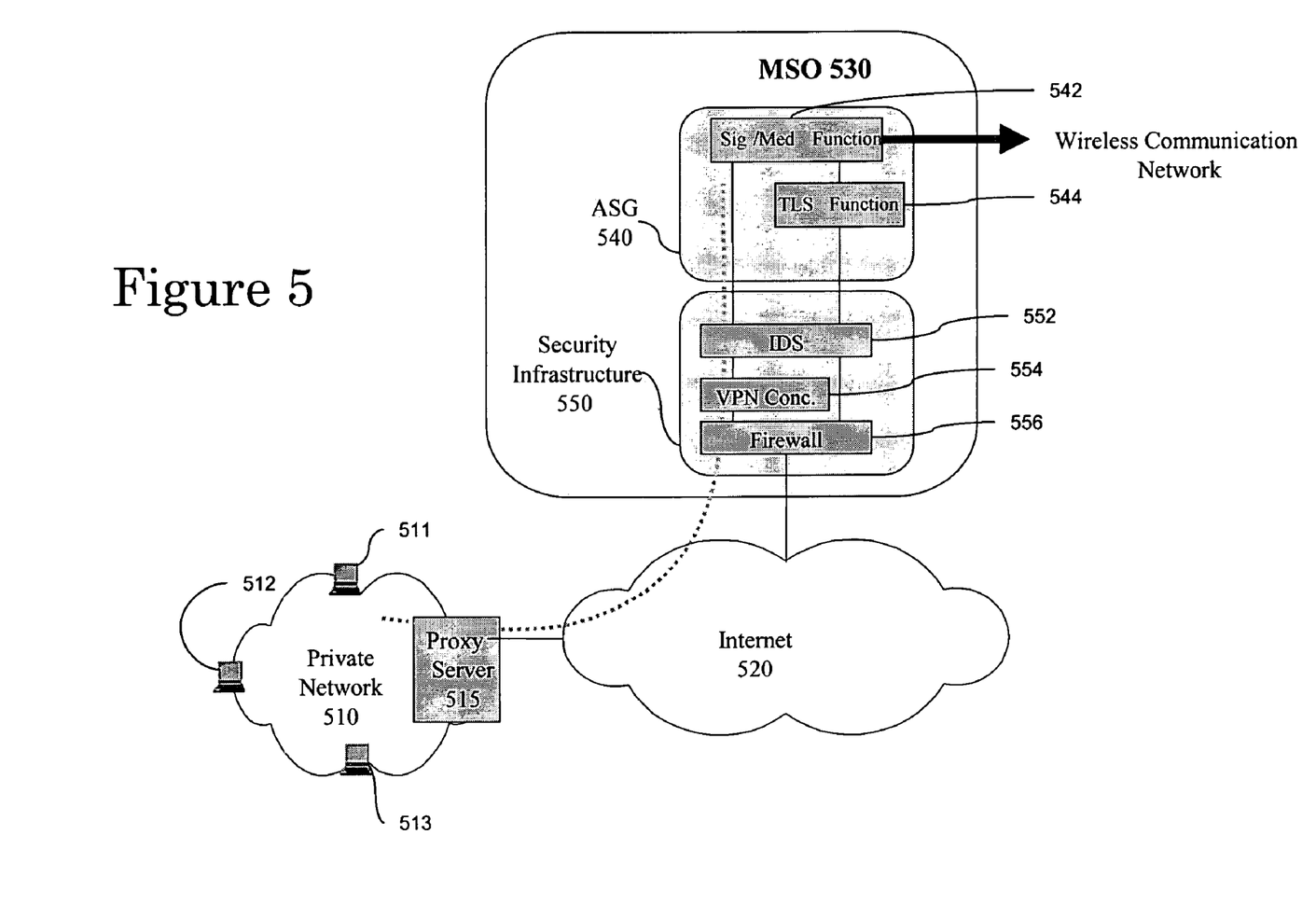
FIG. 5 is a block diagram illustrating an exemplary system for providing voice dispatch communication services to dispatch communication clients located in private networks.

FIG. 5 illustrates an exemplary system for translating between public and private network addresses in accordance with the present invention. The system includes a private network 510, Internet 520 and MSO 530. The private network includes computers 511-513, at least one of which includes dispatch client software. The MSO 530 includes ASG 540 and security infrastructure 550. The ASG 540 includes signaling/media function 542 and TLS function 544. The signaling/media function 542 provides the signaling and media functionality, and the TLS function 544 provides the TLS functionality, described above in connection with FIGS. 1a-4. The security infrastructure includes intrusion detection system (IDS) 552, virtual private network connection 554, and firewall 556, all of which operate in a conventional manner.

A proxy server 515 is provided between private network 510 and Internet 520, and communicates with the ASG 540 using a secured VPN connection. A desktop client registers and communicates with the ASG 540, via proxy server 515. Specifically, the proxy server 515 is assigned a public IP address space (i.e., a range of IP addresses), and maintains a binding between the desktop client's private IP address/port and a public IP address/port assigned to the desktop client upon its registration with the ASG 540. Accordingly, proxy server 515 analyzes dispatch communication messages and translates the addresses between the public and private IP addresses/ports. The desktop client will be unaware of the IP address of ASG 540, and the desktop client will be directed to communicate with the proxy server 515 during the service discovery phase. The proxy server 515 acts as a gateway to ensure proper IP address translation and secured transmission over the Internet. Accordingly, voice dispatch communication services can be provided to dispatch communication clients, which are located behind firewalls.

Although exemplary embodiments have been described in connection with a desktop computer including a dispatch communication client, the present invention is equally applicable to any type of dispatch communication client, e.g., a dispatch communication client on a laptop computer, personal digital assistant, and the like. Moreover, the dispatch communication client can be included on a wireless communication station of a different wireless communication network, such as one which does not operate using the same air-interface protocols as the wireless communication network which supports dispatch communications.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
a first dispatch communication gateway coupled to a dispatch communication client located in a first network;
a second dispatch communication gateway;
a centralized location server, coupled to the first dispatch communication gateway and the second dispatch communication gateway, which stores information regarding a location of a subscriber operating the dispatch communication client; and
a centralized database, coupled to the first dispatch communication gateway and the second dispatch communication gateway, which stores subscriber registration information for the dispatch communication client,
wherein the centralized location server and the centralized database are disposed in a wireless core network that provides the information regarding the location of the subscriber and the subscriber registration information to the first dispatch communication gateway and the second dispatch communication gateway,
wherein the first dispatch communication gateway, the centralized location server and the centralized database are components of a second network, the second network being a wireless communication network,
wherein the first network is a wireless communication network operating using a different air-interface protocol than that of the second network, and wherein when the first dispatch communication gateway receives a registration request from a dispatch client in the first network, the first dispatch communication gateway sends a registration request to the location server, and the location server obtains registration information from the database.

2. The system of claim 1, wherein the first network is a wired communication network.

3. A method for registering a dispatch communication subscriber with a dispatch communication network, the method comprising the acts of:
receiving, by a first dispatch communication gateway, a registration request from the dispatch communication subscriber;
determining that the dispatch communication subscriber is registering from a first dispatch client;
determining that the dispatch communication subscriber previously registered from a second dispatch client;
deregistering the dispatch communication subscriber from the second dispatch client; and
registering the dispatch communication subscriber with the first dispatch client,
wherein the determination that the dispatch communication subscriber previously registered from the second dispatch client comprises the acts of:
sending, by the first dispatch communication gateway to a location server, a registration message;
sending, by the location server to a subscriber database, a query; and
receiving, by the location server from the subscriber database, a response indicating a new challenge from the dispatch communication subscriber is required for registration and an identification of a dispatch communication gateway which the subscriber is currently registered with.

4. The method of claim 3, wherein the first dispatch communication client is located in a first network and the first dispatch communication gateway communicates with a location server that is located in a second network.

5. The method of claim 4, wherein the first network is a wireless communication network operating using a different air-interface protocol than that used by the second network.

6. The method of claim 5, wherein the first dispatch communication client is a mobile station.

7. The method of claim 4, wherein the first network is a wired data communication network.

8. The method of claim 7, wherein the first dispatch communication client is a computer coupled to the wired data communication network.

9. The method of claim 8, wherein the wired data communication network is an internet protocol (IP) network.

10. A method for registering a dispatch communication subscriber with a dispatch communication network, the method comprising the acts of:
receiving, by a first dispatch communication gateway, a registration request from the dispatch communication subscriber;
determining that the dispatch communication subscriber is registering from a first dispatch client;
determining that the dispatch communication subscriber previously registered from a second dispatch client;
deregistering the dispatch communication subscriber from the second dispatch client; and
registering the dispatch communication subscriber with the first dispatch client,
wherein the act of deregistering the second dispatch client comprises the acts of:
sending, by a location server to a second dispatch communication gateway, a notification that the dispatch communication subscriber has registered from the first dispatch client; and
sending, by the second dispatch communication gateway to the second dispatch client, a deregistration message.

11. The method of claim 10, wherein the notification identifies the first dispatch communication gateway.

12. A method for registering a dispatch communication client, the method comprising the acts of:
sending, to a server, a request for identification of a dispatch communication gateway;
receiving, from the server, a response identifying a first dispatch communication gateway;
sending, by a dispatch communication client, a registration request to the first dispatch communication gateway; and
receiving a response to the registration request identifying a second dispatch communication gateway for the dispatch communication client to register with
wherein the response identifying the second dispatch communication gateway also identifies a third dispatch communication gateway.

13. The method of claim 12, further comprising the acts of:
sending, from the location server to the subscriber database, a request for information on a subscriber associated with the dispatch communication client; and
receiving, by the location server from the subscriber database, a response including the information on the subscriber associated with the dispatch communication client.

14. A method for registering a dispatch communication client, the method comprising the acts of:
sending, to a server, a request for identification of a dispatch communication gateway;
receiving, from the server, a response identifying a first dispatch communication gateway;
sending, by a dispatch communication client, a registration request to the first dispatch communication gateway;
receiving a response to the registration request identifying a second dispatch communication gateway for the dispatch communication client to register with;
sending a registration request to the second dispatch communication gateway; and
receiving a registration acceptance from the second dispatch communication gateway.

15. A method for dispatch communications, the method comprising the acts of:
receiving a dispatch communication registration request by a proxy server on a first port from a dispatch communication client;
replacing a first address in the dispatch communication registration request with a second address in the dispatch communication registration request;
forwarding the dispatch communication registration request on a second port to a dispatch communication gateway; storing a relationship between the first address and port and the second address and port;
receiving a dispatch communication message by a proxy server on the second port from the dispatch communication gateway; and
forwarding the dispatch communication message to the dispatch communication client based on the stored relationship.

* * * * *